United States Patent [19]

Puncochar

[11] Patent Number: 5,343,682
[45] Date of Patent: Sep. 6, 1994

[54] ADJUSTABLE HOLD DOWN CLIP

[76] Inventor: James C. Puncochar, Rte. 2, Box 101, St. Paul, Nebr. 68873

[21] Appl. No.: 65,938

[22] Filed: May 21, 1993

[51] Int. Cl.⁵ ............................................. A01D 34/17
[52] U.S. Cl. ........................................................ 56/305
[58] Field of Search ............... 56/298, 305, 296, 303, 56/306, 312; 411/544; 482/26, 27, 30, 31, 32; 248/634

[56] References Cited

U.S. PATENT DOCUMENTS

| | | | |
|---|---|---|---|
| 1,428,657 | 9/1922 | Purdy | 56/305 |
| 2,106,174 | 1/1938 | Herold | 155/77 |
| 3,455,093 | 7/1969 | Stern | 56/305 |
| 3,487,616 | 1/1970 | Schenk | 56/305 |
| 3,722,196 | 3/1973 | Templeton | 56/298 |
| 4,012,891 | 3/1977 | Steuerwald | 56/305 |
| 4,021,999 | 5/1977 | Case | 56/298 |
| 4,553,380 | 11/1985 | O'Halloran | 56/305 |
| 4,894,979 | 1/1990 | Lohrentz | 56/305 |

FOREIGN PATENT DOCUMENTS 2031257 4/1980 United Kingdom .................. 56/305

Primary Examiner—Ramon S. Britts
Assistant Examiner—James A. Lisehora
Attorney, Agent, or Firm—Zarley, McKee, Thomte Voorhees & Sease

[57] ABSTRACT

An adjustable hold down clip for use on apparatus using a reciprocating sickle, for maintaining the sickle in a stabilized, efficient shearing position relative to an underlying cutting surface by pivoting around a pivot member in response to the tightening or loosening of an adjustment nut which counteracts a lifting force imparted onto the clip by a tension member. The tension member is located between the pivot member and sickle, to provide lifting action away from the sickle and minimize drag on the reciprocating blade.

8 Claims, 4 Drawing Sheets

ADJUSTABLE HOLD DOWN CLIP

BACKGROUND OF THE INVENTION

The invention relates generally to a mowing apparatus of the reciprocating sickle type and more particularly to the means for maintaining the sickle in a stabilized, efficient and proper shearing relationship with the underlying sickle guards.

Crop harvesters for mowing apparatus generally include a reciprocating sickle provided with triangular-shaped knife sections and suitable stationary sickle guards which are typically slotted to accommodate a horizontally moving sickle. The guards serve a dual purpose of protecting the sickle from damage and breakage from rocks or other hard objects encountered in the field and of providing a co-acting shear surface to assure a scissor-like action in cooperation with the reciprocating sickle.

The greatest of problems has been in maintaining the cutter sections of the sickle in a sliding relationship to the underlying sickle guards so as to assure an efficient shearing action in cooperation with the ledger plates on the sickle guards. It is important for the optimal operation of the sickle to maintain the sickle bar knife substantially parallel to the ledger surface of the guards and to maintain proper clearance between them for good shearing action.

The knife sections are subjected to irregular but significant upward forces as the sickle and ledger surface of the guard encounter and sever plant material. Heavy grasses and crops, dirt, rocks and other objects tend to clog the cutter assembly and cause the sickle to lift off the guards. If such deflections and upward movement is too great, the proper cooperative shearing action between the sickle knife and the guard ledger surface will be lost. Plant material and debris will either hairpin over the edges of the ledger surface or lodge into the gap between the knife and ledger surface instead of being severed in the intended manner. The deflection of the sickle causes excessive wear through friction of the blade which results in breakage of the sickle or guard portions. Damaged or broken sickle blades require replacement which is often a tedious and time consuming operation.

It has been found necessary to provide some type of hold down plate or clip to retain the sickle in place. The hold down plate or clip helps maintain a proper clearance between the sickle and cutting surface of the guards and resists the upward deflection of the sickle. To maintain the proper clearance between the sickle knife and cutting surface, adjustment means are typically provided on the hold down clip. The difficulty and inconvenience of adjusting hold down clips often results in mowers being operated with improper knife clearance. Too much clearance allows plant material to force the knife blade away from the cutting surfaces and edges of the sickle guard, thereby reducing cutting efficiency. Too small a clearance results in drag on the sickle and an increase in the wear on the sickle and the power required to move the sickle.

Attempts at providing hold down clips with adjustment means have included designs with mounting bolts which must first be loosened before an adjusting screw can be turned to provide for greater or lesser clearance between the sickle and cutting surface such as illustrated in U.S. Pat. No. 4,894,979 to Lohrentz. After the desired adjustment is made, the mounting bolts need to be retightened to return the apparatus into operating condition. This design requires a two step procedure to attain the desired adjustment and entails possible loosening of other components of the cutter assembly such as the guards and wear plates of the sickle bar assembly.

Some designs utilize a multipiece design with a two nut or two screw adjustment means for maintaining a hold down plate in spaced relation to the sickle blade such as illustrated U.S. Pat. No. 4,012,891.

Other solutions such as disclosed in U.S. Pat. No. 4,553,380 to O'Halloran, utilize a fully enclosing sickle guard which is adjusted to vary the slot between the sickle and retaining sickle guards through which the sickle reciprocates. Such designs do not rely on a wear pad in loaded tension to vary the slot.

Other attempts utilize a hold down clip with constant pressure on the knife sections. This clip is in constant contact with the sickle, thereby imparting a drag on the sickle with increased wear and increased power requirements.

In another design, such as the hold down clip illustrated in U.S. Pat. No. 3,455,0932 to Stern, a loaded spring causes a clip to swing about a hinge pin until a rub strip engages the upper surface of the sickle blade. A nut can be adjusted to adjust the pressure exerted on the sickle blade by the rub strip. A pressure release member is used to separate the rub strip from the sickle blade. One embodiment of applicant's invention also utilizes a loaded spring and a nut adjustment means. Applicant's invention, however, discloses a loaded tensioning spring which lifts the clip and pad away from the sickle blade rather than toward it. Adjustment or contact with the sickle blade is made through a nut which counteracts the lifting action on the clip. No extra pressure release member is needed to remove the hold down clip off the sickle blade. The lifting action of the clip is facilitated by a pivot member located at the rear of the clip so that the tensioning means is between the pivot member and the contact point of the clip with the sickle. By contrast, in Stern a centrally placed horizontal hinge pin is located between the tensioning means and the contact point of the clip with the sickle.

The present invention in a preferred embodiment also provides for a base plate which further acts as a stabilizing device on the sickle. Furthermore, the present invention discloses wear pads which may be specially heat treated in contrast to the antifriction rub strip disclosed by Stern. Applicant's hold down clip also consists of a minimum of parts allowing simplified manufacture.

SUMMARY OF THE INVENTION

Accordingly, one important object of the present invention is to provide a hold down clip of simplified structure which is able to stabilize the sickle blade and enhance the sickle cutting efficiency with a minimum of contact between the sickle blade and hold down clip. Pursuant to the foregoing, one embodiment of the present invention contemplates using a loaded tensioning spring which maintains a lifting action on the clip. A second embodiment utilizes a strap of rubber material to provide the lifting force. The lifting action on the clip minimizes the downward pressure on the sickle blade and thereby minimizes drag on the reciprocating blade. The lifting action is facilitated by a pivot member located on the body of the clip so that the tensioning means are between the pivot member and the contact points of the clip's wear pad. A nut which may be adjusted so as to counteract the lifting action maintains the desired clearance distance between the wear pad and the sickle blade. The nut may also be used to vary the pressure imparted onto the sickle blade through the wear pad if desired.

This nut, in conjunction with the lifting force, allows for fine adjustment of the hold down clip to accomplish minute adjustments of the clearance distance between the wear pad and the sickle blade or pressure imparted onto the sickle blade by the wear pad.

It is a further object of the invention to provide a clip that can be easily removed and allow the easy removal or readjustment of a sickle. The clip of the present invention can be removed in one piece by removing nuts on the hold down clip base plate which allows the clip to be removed from the cutter bar assembly. The sickle blade and hold down clip could then be replaced, repaired or readjusted.

The wear pads and edge of the base plate overhanging the knife back section may be specially heat treated to be long lasting under high temperature conditions. In one embodiment the wear pad is replaceable by loosening a counter-sunk flathead socket screw and nut on a wear pad retaining bolt which holds the wear pad on the adjusting arm.

It is a further object of the invention to provide additional means to stabilize the sickle and enhance sickle cutting efficiency. This is accomplished in the present invention by milling or machining of the base plate to provide an overhanging lip which rests on the top of the knife back section or rear of the sickle blade, thereby imparting additional stability and control of the reciprocating sickle.

Thus, the present invention is an adjustable hold down clip for a sickle bar type mower or crop harvester. The clip has a loaded tensioning spring or a rubber insert which exerts a lifting force on the body of the clip away from the sickle blade. The lifting action on the clip is facilitated by a pivot member positioned on the body of the clip so that the tensioning means is between the pivot member and contact points of the clip with the sickle blade. The clip either contacts the sickle blade through a wear pad or the wear pad of the clip is in spaced relation to the sickle blade. The lifting force of the clip can be counteracted by a one nut adjustment which increases the loaded tension and thereby decreases the distance of the wear pad from the sickle. Alternatively, the distance of the wear pad of the clip from the sickle can be increased by turning the adjustment nut in the opposite direction. If the wear pad is in actual contact with the sickle blade, the pressure on the sickle blade can be increased or decreased through the adjustment nut. The hold down clip is anchored by a bolt to a base plate which, in turn, is anchored to the wear plate of a cutter bar assembly. The base plate is provided with lateral adjustment slots through which pass bolts anchoring the base plate to the wear plate.

The adjustable hold down clip extends over the rearwardmost portion of the sickle blade or knife back section with varying degrees of clearance to allow for the knife back to reciprocate under the arm of the hold down clip body in an unimpeded fashion. The adjustable hold down clip extends toward the forwardmost portions of the sickle blade toward the triangular-shaped cutting edge portions of the sickle blade. The adjustable hold down clip's wear pad is in spaced relation or contact with the sickle blade. In one embodiment, the wear pad is retained in the clip body by a retaining bolt from the top and by a countersunk socket screw from the bottom. The wear pad and milled edge of the base plate contacting the knife back are heat treated. The lateral adjustment slot on the base plate allows the hold down clip to move parallel to or contact the sickle blade on varying forward or rearward portions of the sickle blade.

DESCRIPTION OF THE PREFERRED EMBODIMENT

Figure 1:
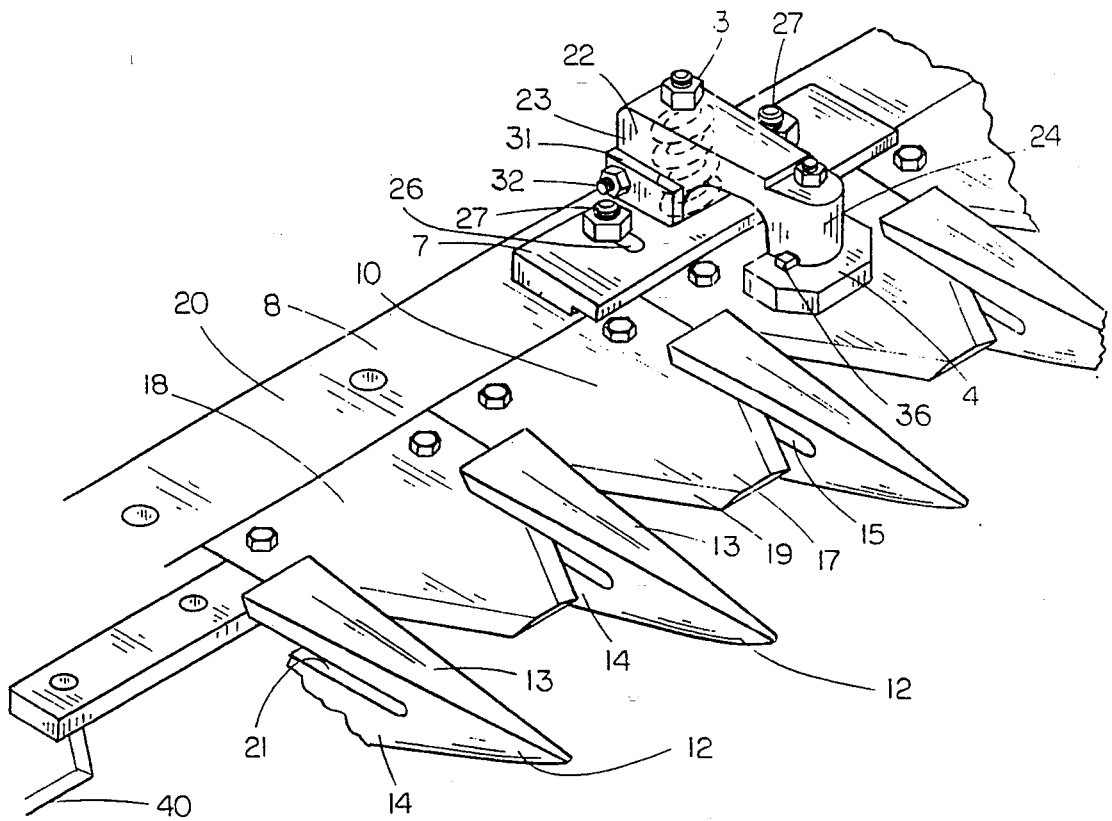
FIG. 1 is a top perspective view of the hold down clip mounted on a mower bar.

With continued reference to the drawings, a cutter assembly as shown in FIG. 1 includes an elongated transversely extending frame member 20 having a plurality of spaced sickle guards 12 extending forwardly therefrom. The sickle guards are generally mounted on the underside of the frame member. Each of the guards 12 include an upper and lower half 13 and 14 respectively which are held in position on the cutter assembly by a bolt and nut assembly or carriage bolts.

Figure 2:
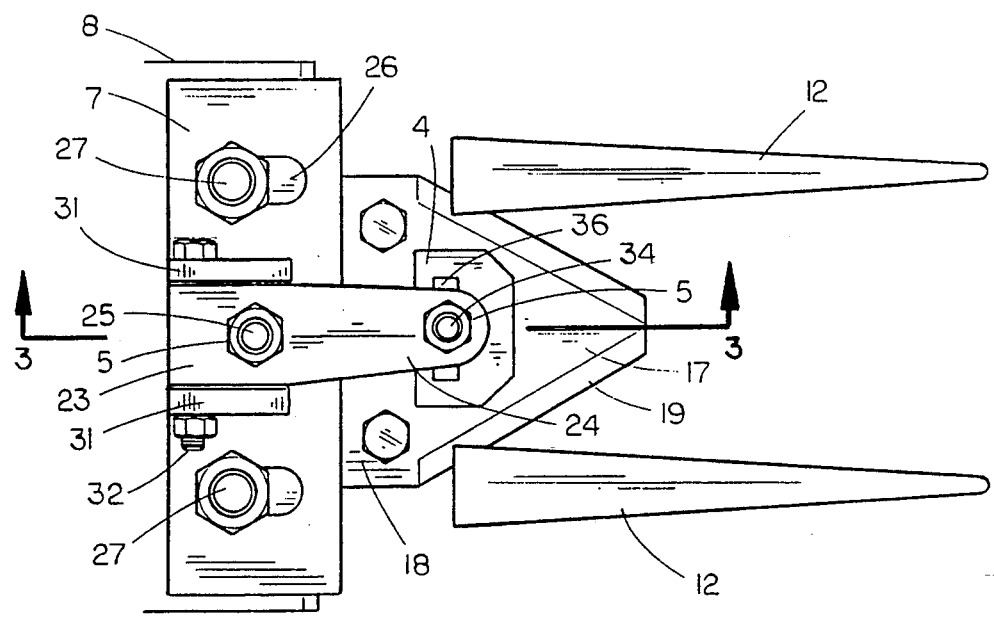
FIG. 2 is a top plan view of the hold down clip.

The upper and lower halves of the guard typically define a slot 15 which accommodates an elongated transversely extending sickle blade 10 which reciprocates in a transverse direction relative to the direction of the machine travel. The sickle is caused to reciprocate by conventional drive means 40 at one end of the cutter bar. As shown in FIGS. 1 and 2, the sickle typically consists of a forward triangular-shaped knife section 17 and a knife back 18 section. Sharp beveled edges on the triangular sections 19 move back and forth in the slot and across a ledger surface 21 on the lower half of the sickle guard to cut grass or other vegetation in conjunction with a cutting edge of the ledger surface. A stationary wear plate 8 abuts the knife back 18 section and serves to anchor the base plate 7 of the adjustable hold down clip 22 to the cutter assembly as further described herein.

In order to maintain the sickle blade and ledger surface in cutting relation, adjustable hold down clips 22 are provided. The adjustable hold down clips are regularly spaced at intervals along the sickle blade. The body of the adjustable hold down clip includes a rearward foot portion 23 at one end and a forwardly extending pad portion 24 at the opposite end which extends over the sickle.

Figure 3:
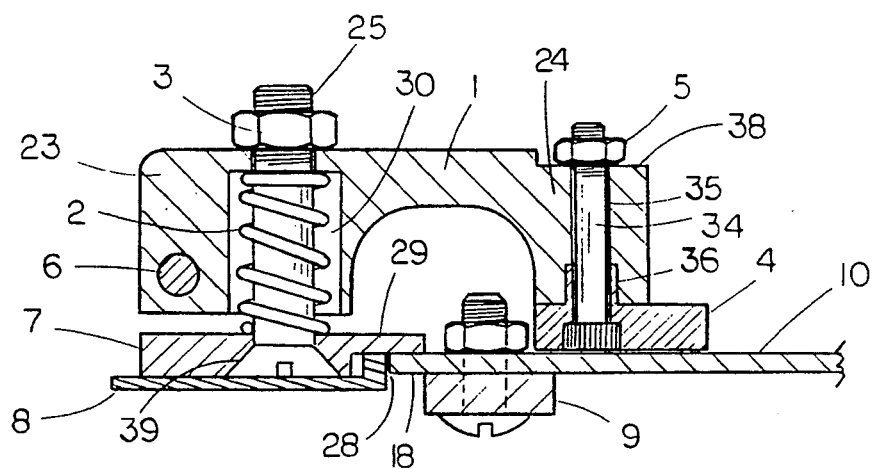
FIG. 3 is a cross-sectional view taken along line 3—3 of FIG. 2.

The adjustable hold down clip is anchored by an adjustment bolt 25 to a base plate 7. The base plate includes lateral mounting slots 26 as illustrated in FIG. 1 through which a nut and bolt system attaches the base plate to the frame of the cutter assembly. The bolts 27, as depicted in FIGS. 1 and 2, pass through a wear plate 8 on the frame of the cutter assembly with the wear plate positioned underneath the base plate and in contact with or spaced relation to the knife back edge 18 of the sickle. The base plate is milled or machined out at its edge to clear the wear plate and sickle blade to provide an overhang 29 of the sickle's knife back section as depicted in FIG. 3. This overhang 29 imparts greater stability to the reciprocating sickle. The base plate can be milled to permit the use of a standard 5½" or 6" wear plate. Alternatively, the base plate can be designed without an overhang to accommodate a sickle head 11, as shown in a second embodiment of the clip 22, in FIG. 4.

The foot portion 23 of the adjustable hold down clip contains a cavity 30 through which passes the adjustment bolt 25 which fastens the adjustable hold down clip to the base plate. The adjustment bolt 25 fastens the hold down clip onto the base plate 7 through a cavity 39 in the base plate which receives the adjustment bolt 25. Spiralling around the adjustment bolt 25 is a tension spring or loaded spring 2. The spring 2 is bounded on its bottom end by contact with the base plate 7 and is bounded on its top end by contact with the upper end of cavity 30. The adjustment nut 3 is threadably engaged on the adjustment bolt 25. The foot portion 23 of the adjustable hold down clip is bounded on both sides by adjusting arm standards 31 as shown in FIGS. 1-2.

A pivot aperture runs transversely through the foot portion 23 of the adjustable hold down clip and the adjusting arm standards 31 in the lengthwise direction of the cutter assembly. The pivot aperture 6 accommodates a pivot bolt 32 around which the adjustable hold down clip can pivot. The pivot aperture 6 is placed in the rearward bottom portion of the hold down clip on a side of the spring 2 opposite the pad portion. That is, the tensioning means or spring 2 is positioned at a location between the pivot bolt 32 and the contact point of the adjustable hold down clip, i.e. the wear pad 4. As a result, the tension spring 2 is able to impart an upward lifting action on the body of the adjustable hold down clip. The upward lifting force on the body of the adjustable hold down clip is directed away from the sickle blade 10. This upward motion results in a pivoting of the adjustable hold down clip body around the pivot bolt 32. The placement of the pivot aperture facilitates the pivoting of the body of the adjustable hold down clip as the clip and wear pad are adjusted to be positioned either closer to, or farther away from, the sickle 10 by the adjustment nut 3.

The upward pressure on the hold down clip body is counteracted by an adjustment nut 3 on the adjustment bolt 25. By tightening the adjustment nut 3, the wear pad 4 located in the pad portion 24 of the adjustable hold down clip can be moved closer to the sickle 10 or can be used to increase the contact pressure imparted upon the sickle 10.

The body of the adjustable hold down clip extends or arches over the knife back section of the sickle by way of a connecting arm 1 (FIG. 3) that is sufficiently raised to permit clearance of the knife back section when it reciprocates. The arm 1 can be arched to a greater or lesser extent so that varying degrees of clearance are provided, as shown in the second embodiment of FIG. 4.

Figure 4:
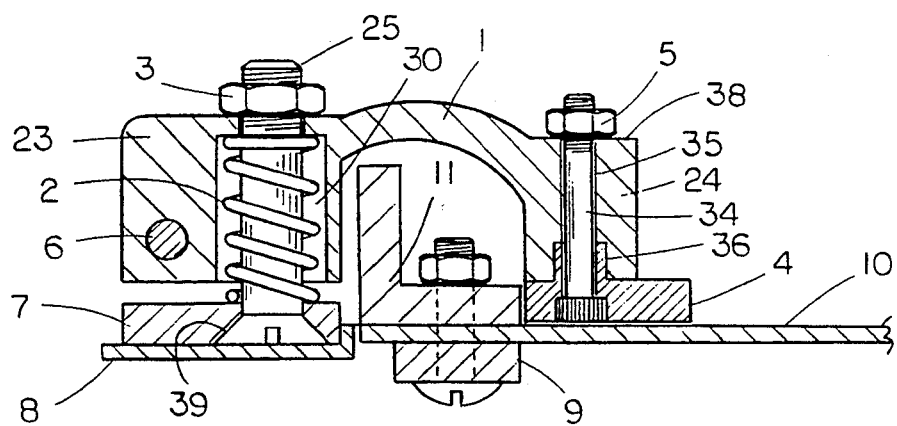
FIG. 4 is a view similar to FIG. 3, of a second embodiment of the invention.

In the second embodiment of the invention shown in FIG. 4, the connecting arm 1 arches to provide a high clearance for special knife back sections which include vertical extensions on sickle heads 11 or otherwise require additional space. Adjustable hold down clips which embody a high clearance connecting arm to accommodate vertically extending sickle heads 11 on the sickle blade 10 may, but do not necessarily, omit the milled out overhang 29 of the base plate.

The connecting arm 1 terminates in the pad section 24 of the adjustable hold down clip which extends down toward the sickle blade. The pad section 24 of the adjustable hold down clips terminates in a wear pad 4 which is either in spaced relation to the sickle or in contact on the sickle.

Figure 5:
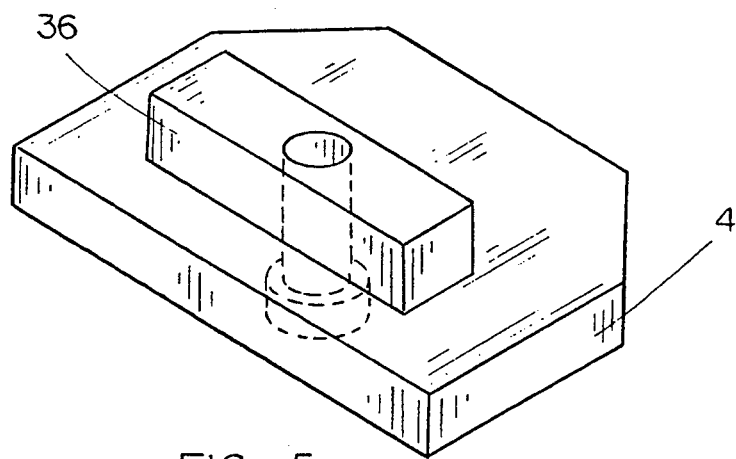
FIG. 5 is a top perspective view of the wear pad of the clip shown in FIGS. 1-3.

With reference to FIGS. 3-5, the wear pad 4 is retained in the adjustable hold down clip body by a wear pad retaining bolt 34 extending vertically through the wear pad stem cavity 35. The wear pad retaining bolt 34 extends toward the wear pad through stabilizing shoulders 36 of the wear pad 4 which are positioned through a slot of the wear pad section of the clip body. This slot in the clip body receives the stabilizing shoulders 36 of the wear pad 4. The wear pad 4 is further held in place by a countersunk flathead socket screw 37. The wear pad retaining bolt 34 is threadably engaged by a nut 5 positioned upon a plateau 38 on top of the clip body's wear pad portion. The wear pad 4 is easily replaceable when worn by loosening of the threadably engaged nut 5 on the wear pad retaining bolt and by unscrewing the countersunk socket screw 37.

The wear pad 4 is a heat treated unit. The heat treatment enhances the wearing capabilities and reduces the replacement frequency of the wear pad. The milled out edge 29 of the base plate which overhangs the knife back and stabilizes the sickle is also heat treated. The edges of the wear pad or periphery of the wear pad may be subjected to the heat treatment to the exclusion of other areas of the wear pad. Similarly, the milled out edge overhanging the knife back may only be subjected to the heat treatment. Alternatively, all wearing surfaces or surfaces subjected to friction and frictional heat may be heat treated including but not limited to the portion of the wear plate that contacts the knife back. The heat treated wear pad of the present invention has an estimated 3,000 acre life span for hay cutting conditions. Grain swather and combine use should result in an even greater life span for the wear pad. The base plate 7 could be made as a jig welded built up unit or it could be a one piece casting. The body of the adjustable hold down clip could be cast or formed by stamping. The wear pad 4 could be formed by casting. The heat treatment would be performed after the machining and casting were completed.

The design and dimensions of the adjustable hold down clip of the present invention insure that the hold down clip will not be affected or only minimally affected by mud, earth or vegetation residue build-up on the sickle.

It is to be understood that prior to the operation of the reciprocating sickle, the adjustment nut 3 is adjusted to move the wear pad 4 of the adjustable hold down body to a desired distance from the sickle. The wear pad 4 and base plate overhang 29 of the adjustable hold down body keep the sickle in a spaced relation to the underlying sickle guards 12 which enables efficient shearing of vegetation to take place between the sickle and ledger surface 21 of the sickle guard. The wear pad 4 and base plate 7 overhang help prevent upward deflections of the sickle blade. If desired, the wear pad can be positioned so as to be in constant contact with the sickle. The nuts on bolts 27 can be loosened to allow removal of the adjustable hold down clip and base plate 7 from the wear plate 8 and cutter assembly and then replacement of the adjustable hold down clip.

Figure 6:
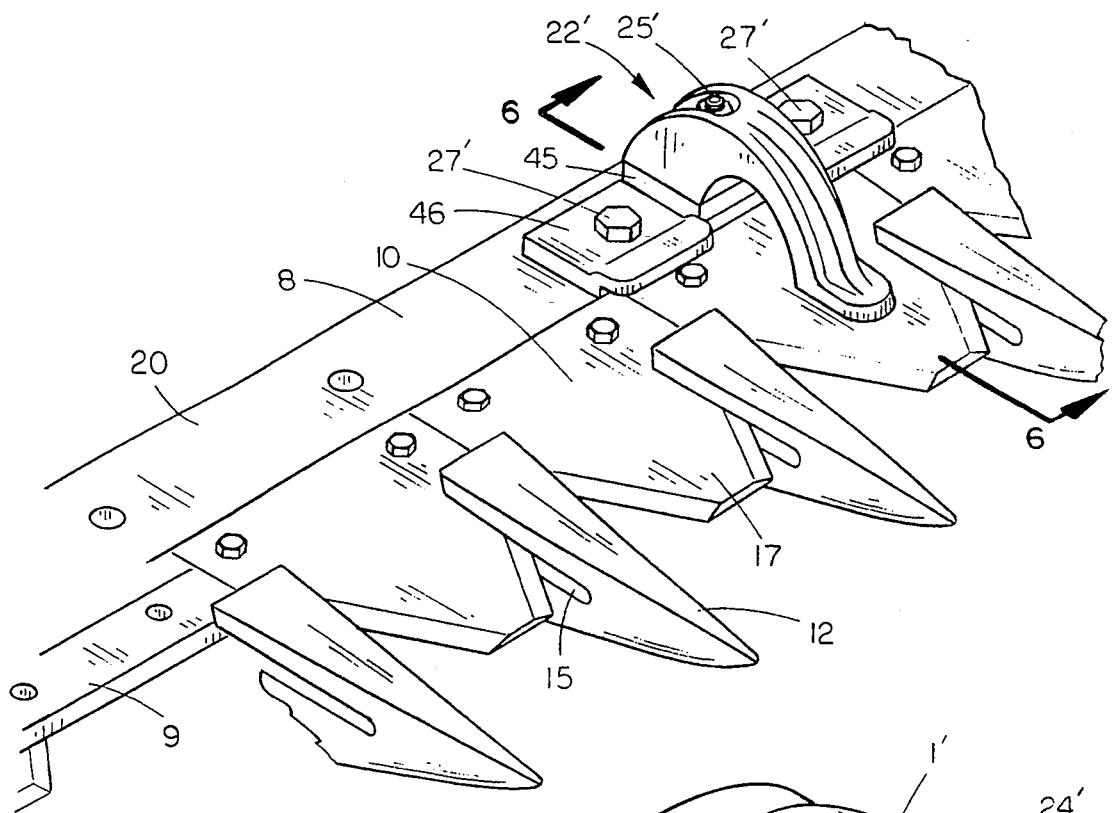
FIG. 6 is a top perspective view of a third embodiment of the clip, mounted on a mower bar.

Referring now to FIG. 6, a third embodiment of the hold down clip is designated generally at 22' and is shown mounted on a conventional mover bar, similar to FIG. 1. As in the first embodiment, the mower bar includes a frame member 20 with a plurality of spaced sickle guards 12 extending forwardly therefrom. A sickle 10 is mounted for reciprocation on a support strap 9 to reciprocate forward knife sections 17 through slots 15 so as to produce the required cutting action.

Figure 7:
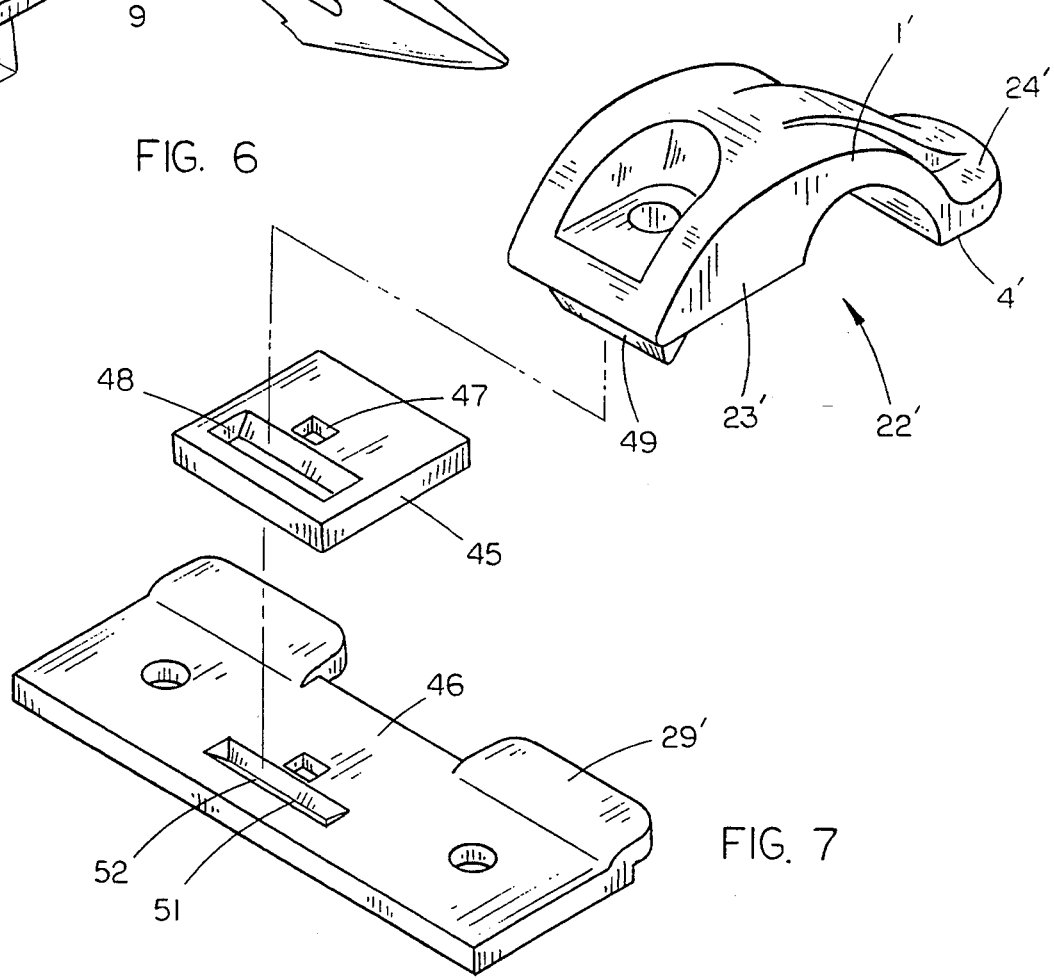
FIG. 7 is an exploded perspective view of the clip of FIG. 6.
Figure 8:
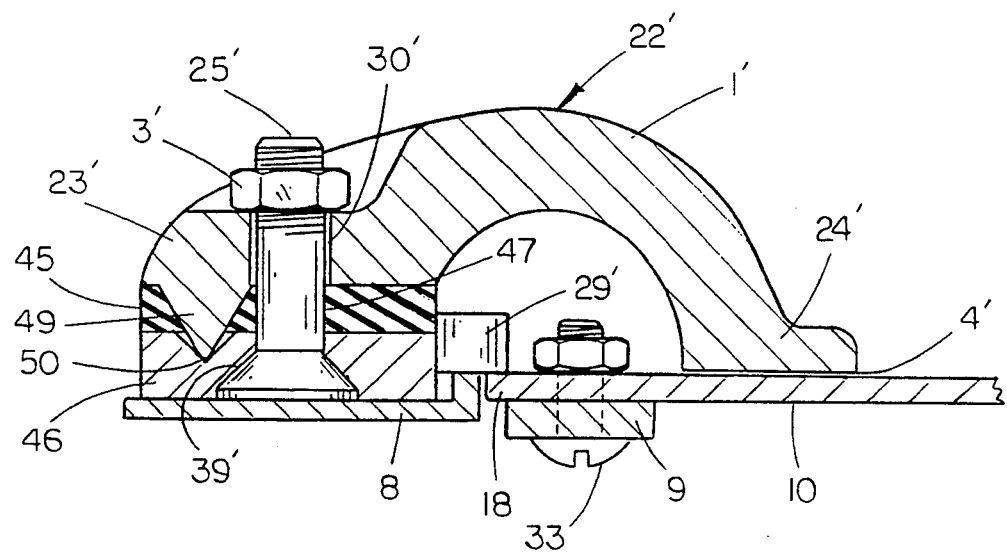
FIG. 8 is a cross-sectional view taken substantially along line 8—8 of FIG. 6.

As shown in FIG. 6–8, the third embodiment of hold down clip 22' is much simpler than the previous embodiments. Clip 22' is connected through an elastomeric sheet 45 to a base plate 46 mounted to wear plate 8 utilizing bolts 27'.

Figure 9:
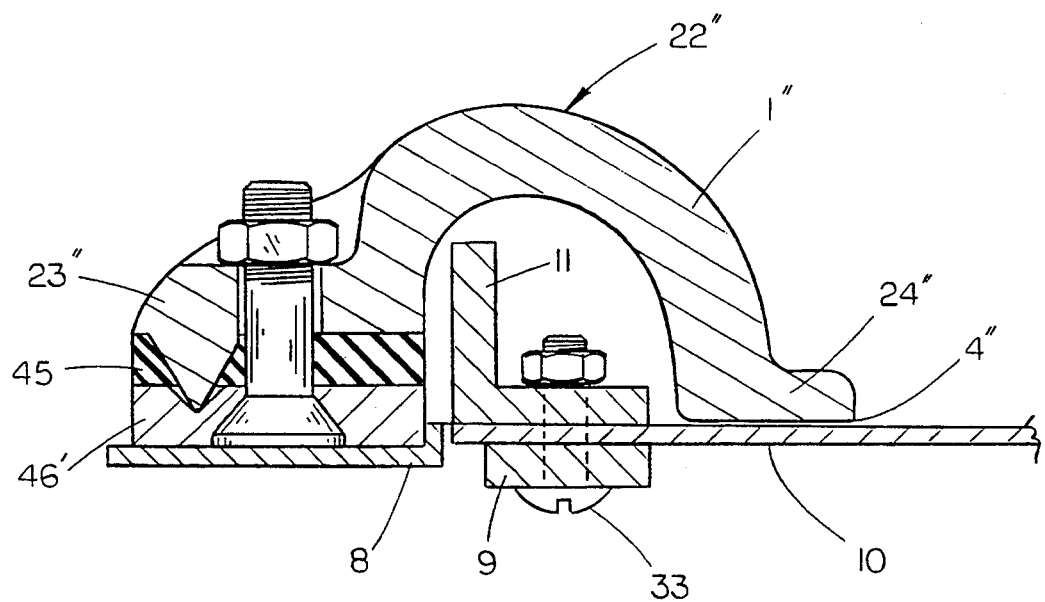
FIG. 9 is a view similar to FIG. 8, of a fourth embodiment of the clip.

An adjustment bolt 25' adjustably anchors clip 22' to base plate 46, as shown in FIG. 8. As with the first and second embodiments of the invention, base plate 46 may have an overhang 29' which projects over the wear plate 8 and knife back section 18 to impart greater stability to the reciprocating sickle blade 10. Alternatively, base plate 46' can be designed without such an overhang, to accommodate a sickle head 11, as shown in a fourth embodiment of clip 22" in FIG. 9.

The foot portion 23' of clip 22' contains a cavity 30' through which passes the adjustment bolt 25' to fasten clip 22' to base plate 46. Base plate 46 also includes a cavity 39' which receives the head of adjustment bolt 25' such that adjustment bolt 25' does not protrude downwardly beyond the bottom of base plate 46.

As described above, the first and second embodiment of the invention utilized a tension spring to provide the lifting action on clip 22. The third and fourth embodiments of the present invention utilize an elastomeric sheet 45 positioned between foot portion 23' and base plate 46, to provide this lifting action.

Referring now to FIG. 7, sheet 45 is generally rectangular so as to match the shape of the bottom surface of rearward foot portion 23'. An aperture 47 generally centered in sheet 45 receives adjustment bolt 25' therethrough, as shown in FIG. 8. An elongated aperture 48 spaced rearwardly of aperture 47 in sheet 45 receives a pivot member 49 depending from the bottom surface of foot portion 23', as shown in FIG. 8.

Referring once again to FIG. 8, pivot member 49 extends transversely with respect to the longitudinal axis of hold down clip 22' and has a generally triangular cross section with a depending pivot edge 50. A pivot member receiving channel 51 is formed in the upper surface of base 46 and located to receive pivot member 49 therein. Receiving channel 51 has beveled surfaces forming a pivot valley 52 which will receive pivot edge of pivot member 49. In order to permit pivotal movement of clip 22' about pivot edge 50, pivot valley 52 subscribes an angle greater than the angle subscribed by pivot edge 50. Preferably, pivot valley 52 has an angle of approximately 90°, while pivot edge 50 has an angle of approximately 60°, thereby permitting pivotal movement of clip 22 of up to 15° in a forward or rearward direction.

As with the previous embodiments, it is important to note that pivot member 49 is located rearwardly of adjustment bolt 25' such that the tensioning means is located between the pivot edge 50 and the contact point of the clip 22' at the wear pad surface 4' on pad portion 24'. Preferably, elastomeric sheet 45 is a resilient rubber material and has a thickness less than the vertical height of pivot member 49, such that pivot edge 50 projects downwardly through sheet 45 and into channel 51. However, sheet 45 should have a thickness such that wear pad surface 4' is spaced upwardly away from sickle blade 10 when adjustment nut 3' is out of contact with foot portion 23' of clip 22'. In this way, adjustment nut 3' must be threaded downwardly to overcome the biasing force of elastomeric sheet 45 even before wear pad surface 4' contacts sickle blade 10. This results in an upward lifting action on the body of clip 22' which is directed away from sickle blade 10. The upward pressure on clip 22' is counteracted by adjustment nut 3', which will cause clip body 22' to pivot about pivot edge 50 when nut 3' is tightened. In this way, hold down clip 22' can be moved closer to sickle blade 10 or can be used to increase contact pressure imparted on sickle blade 10.

Connecting arm 1' functions similar to the previous embodiments, and connects rearward foot portion 23' to forward pad portion 24', while arching upwardly to permit clearance of knife back section 18 and the projecting bolts 33 holding the sickle blade to the support strap 9. In the fourth embodiment of the invention, shown in FIG. 9, connecting arm 1" arches to provide a high clearance for special knife back sections which include sickle heads 11, or otherwise require additional space. Preferably, this embodiment of hold down clip 22" omits the overhang 29' of the third embodiment on base plate 46'.

Connecting arm 1' of the third embodiment of hold down clip 22' shown in FIG. 8, terminates in the forward pad section 24'. Pad section 24' includes a wear pad surface 4' integral therewith which serves as an upper limit for sickle blade 10. Wear pad surface 4' may either be in spaced relation to sickle blade 10, or in contact therewith. It can seen that the third and fourth embodiments of the invention are much simpler to manufacture than the first and second embodiments, since wear pad surface 4' is formed as an integral part of clip 22', rather than as a separate removable part. As with the prior embodiments, wear pad surface 4' may be heat treated to enhance wearing capabilities.

It should be appreciated that the adjustable hold down clip disclosed herein can be used on any device using a reciprocating sickle or sickles and stabilizing guards or columns. Such devices include but are not limited to windrowers, mower conditioners, mowers and combines.

While a specific embodiment of an adjustable hold down clip has been shown and described, it should be apparent that certain changes, alterations and substitutions can be made in the materials, design, dimensions of the elements therein and that such changes are within the scope and spirit of the invention.

I claim:

1. In combination:

a sickle bar mower having an elongated frame member and a sickle blade mounted thereon for reciprocating movement, said sickle blade projecting forwardly from said frame member and reciprocating transversely with respect thereto;

an elongated base plate mounted to said frame member rearwardly of said sickle blade, said base plate having an upper surface and forward and rearward edges;

means for adjustably and pivotably mounting a hold down clip to said base plate;

a hold down clip having forward and rearward ends, said forward and rearward ends having bottom surfaces, said clip adjustably and pivotably connected to said frame member;

said hold down clip forward end projecting forwardly over said sickle blade and having a wear pad on the bottom surface thereof for contact with said sickle blade;

said means for adjustably and pivotably mounting said clip including:

an adjustment bolt extending upwardly from said base and through said rearward portion of said clip and having one end projecting upwardly from said clip;

an adjustment nut operably engaged on the projecting end of said bolt for selective upward and downward movement thereon;

tensioning means interposed between said base plate and said clip for biasing said clip upwardly on said bolt against said adjustment nut; and a pivot member located rearwardly of said adjustment bolt about which said clip pivots upon selective movement of the adjustment nut;

said pivot member including a depending portion depending from the rearward end bottom surface, having a pivot edge oriented transversely to a longitudinal axis of the clip about which the clip will pivot, said pivot edge in pivotal contact with said base plate.

2. The combination of claim 1, wherein said tensioning means includes a sheet of resilient elastomeric material having a thickness great enough to bias said wear pad upwardly out of contact with the sickle blade when said adjustment nut is moved upwardly on said bolt.

3. The combination of claim 1, wherein said base plate upper surface has a channel formed therein adapted to receive the pivot edge of said depending portion, said channel having a depth less than a distance the depending portion depends from the bottom surface of said clip rearward portion, said channel having a width great enough to permit pivotal movement of the clip when the pivot edge is received within said channel.

4. The combination of claim 3, wherein said depending portion has a generally triangular cross-section with the pivot edge forming a depending angle of the cross-section, and wherein said channel has beveled walls to form a pivot valley, an angle between the beveled walls of the valley being greater than the depending angle of said depending portion pivot edge, such that the pivot member is pivotable within said pivot valley.

5. The combination of claim 4, wherein said pivot valley walls form an angle of about 90° and wherein said pivot edge has an angle of about 60°.

6. The combination of claim 1, wherein said tensioning means includes a sheet of resilient elastomeric material having a thickness great enough to bias said wear pad upwardly out of contact with the sickle blade when said adjustment nut is moved upwardly on said bolt.

7. The combination of claim 6, wherein said elastomeric sheet covers substantially the entire bottom of said rear portion of the clip, and includes a first aperture through which said adjustment bolt is journaled, and includes a second aperture through which said depending portion is journaled.

8. The combination of claim 7, wherein said sheet has a thickness less than the distance which the depending portion projects from the bottom surface of the clip rearward end, such that the depending portion projects downwardly through said sheet.

* * * * *